(12) United States Patent
Uberoy

(10) Patent No.: US 8,804,494 B1
(45) Date of Patent: Aug. 12, 2014

(54) METHODS AND APPARATUS FOR IMPROVING NETWORK PERFORMANCE USING VIRTUAL INSTANCES FOR SYSTEM REDUNDANCY

(75) Inventor: Pawan Uberoy, San Jose, CA (US)

(73) Assignee: WiChorus, Inc., Naperville, IL (US)

( * ) Notice: Subject to any disclaimer, the term of this patent is extended or adjusted under 35 U.S.C. 154(b) by 153 days.

(21) Appl. No.: 13/439,268

(22) Filed: Apr. 4, 2012

(51) Int. Cl.
*H04L 12/26* (2006.01)

(52) U.S. Cl.
USPC ........................................ 370/219

(58) Field of Classification Search
None
See application file for complete search history.

(56) References Cited

U.S. PATENT DOCUMENTS

| | | | | |
|---|---|---|---|---|
| 2009/0313447 A1* | 12/2009 | Nguyen et al. | ................ | 711/162 |
| 2010/0220656 A1* | 9/2010 | Ramankutty et al. | ......... | 370/328 |
| 2011/0185063 A1* | 7/2011 | Head et al. | ..................... | 709/226 |
| 2011/0235505 A1* | 9/2011 | Eswara et al. | ................ | 370/221 |
| 2011/0289345 A1* | 11/2011 | Agesen et al. | ................ | 714/4.11 |
| 2011/0317703 A1* | 12/2011 | Dunbar et al. | ................ | 370/392 |
| 2012/0084414 A1* | 4/2012 | Brock et al. | ................... | 709/221 |
| 2012/0303835 A1* | 11/2012 | Kempf et al. | .................. | 709/235 |
| 2012/0320817 A1* | 12/2012 | Xu et al. | ......................... | 370/315 |
| 2013/0083650 A1* | 4/2013 | Taleb et al. | ..................... | 370/218 |
| 2013/0091282 A1* | 4/2013 | Tontiruttananon et al. | ... | 709/226 |
| 2013/0091376 A1* | 4/2013 | Raspudic et al. | ................. | 714/3 |
| 2013/0124712 A1* | 5/2013 | Parker | ........................... | 709/224 |
| 2013/0136032 A1* | 5/2013 | Meirosu et al. | ................ | 370/254 |
| 2013/0188555 A1* | 7/2013 | OLSSON et al. | .............. | 370/328 |
| 2013/0254762 A1* | 9/2013 | Cochran | ............................ | 718/1 |
| 2013/0336286 A1* | 12/2013 | Anschutz | ....................... | 370/331 |

* cited by examiner

*Primary Examiner* — Otis L Thompson, Jr.
(74) *Attorney, Agent, or Firm* — James M. Wu; JW Law Group

(57) ABSTRACT

A method and/or network configuration configured to enhance network performance using virtual system redundancy is disclosed. The network configuration, in one embodiment, includes a first packet core entity ("PCE"), routing cloud, and a second PCE. The first PCE, which includes a virtual backup module configured to facilitate virtual backup, actively provides network services to subscribers. The routing cloud provides network communication between network entities or PCEs across geographical distances. The second PCE, in one embodiment, includes a virtual smart core ("VSC"), wherein the VSC facilitates a redundancy instance for the first PCE. The first PCE and the second PCE may be separated with a long distance.

20 Claims, 6 Drawing Sheets

METHODS AND APPARATUS FOR IMPROVING NETWORK PERFORMANCE USING VIRTUAL INSTANCES FOR SYSTEM REDUNDANCY

FIELD

The exemplary embodiment(s) of the present invention relates to communications network. More specifically, the exemplary embodiment(s) of the present invention relates to network redundancy.

BACKGROUND

With rapid growth of mobile data transfer over a high-speed communication network such as 3G (third-generation) or 4G (fourth-generation) cellular services, authenticating, managing, and controlling such data transfer become increasingly difficult and complicated. A conventional network layout includes Internet, LAN (local area network), and wireless networks having hundreds of network nodes, entities, systems such as access switches, routers, and bridges for facilitating data delivery from source devices to destination devices. Authenticating and transferring massive amount of data efficiently between wireless portable devices such as smart phones and/or laptops over a typical and/or standard network becomes increasingly challenging.

To manage traffic flows efficiently between sources and destinations, various routing nodes or entities perform routing activities in accordance with context of subscriptions, such as connectivity, states, quality of service ("QoS"), et cetera. Such context of subscriptions is typically stored in a datacenter, routing entity, subscriber box, and the like. A problem associated with such datacenter, entity, or subscriber box is that the routing performance can be negatively impacted when such datacenter or entity is down due to the event of natural disaster. When such datacenters, routing entities, or routers fail, the associated network service to connected subscribers stops. Since the base station, for example, may not be aware of the status of datacenter and may continue forwarding data packets to the down node, the packet(s) may be dropped or discarded. Packet drop typically affects overall network performance.

A conventional approach to mitigate the impact of datacenter failure or node failure is to establish a one-to-one (1:1) redundant box or entity. When the active datacenter (or node) is down, the redundant datacenter (or node) takes over the routing responsibility. A drawback associated with such 1:1 redundant configuration is that it wastes resources because the redundant box usually idles most of time. In addition, when the main datacenter recovers, the transition from the redundant box to the newly recovered datacenter takes time and resources.

SUMMARY

A network configuration is capable of enhancing network performance using virtual system redundancy via routing cloud. The network configuration, in one embodiment, includes a first packet core entity ("PCE"), routing cloud, and a second PCE. The PCE, in one example, can be an Evolution Packet Core ("EPC") for LTE (Long Term Evolution) communication network. The first PCE, which includes a virtual backup module configured to facilitate virtual backup, actively provides network services to subscribers. The routing cloud provides network communication between network entities or PCEs across geographical distances. The second PCE, in one embodiment, includes a virtual smart core ("VSC"), wherein the VSC facilitates a redundancy instance for the first PCE. The first PCE and the second PCE may be separated by a long distance.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
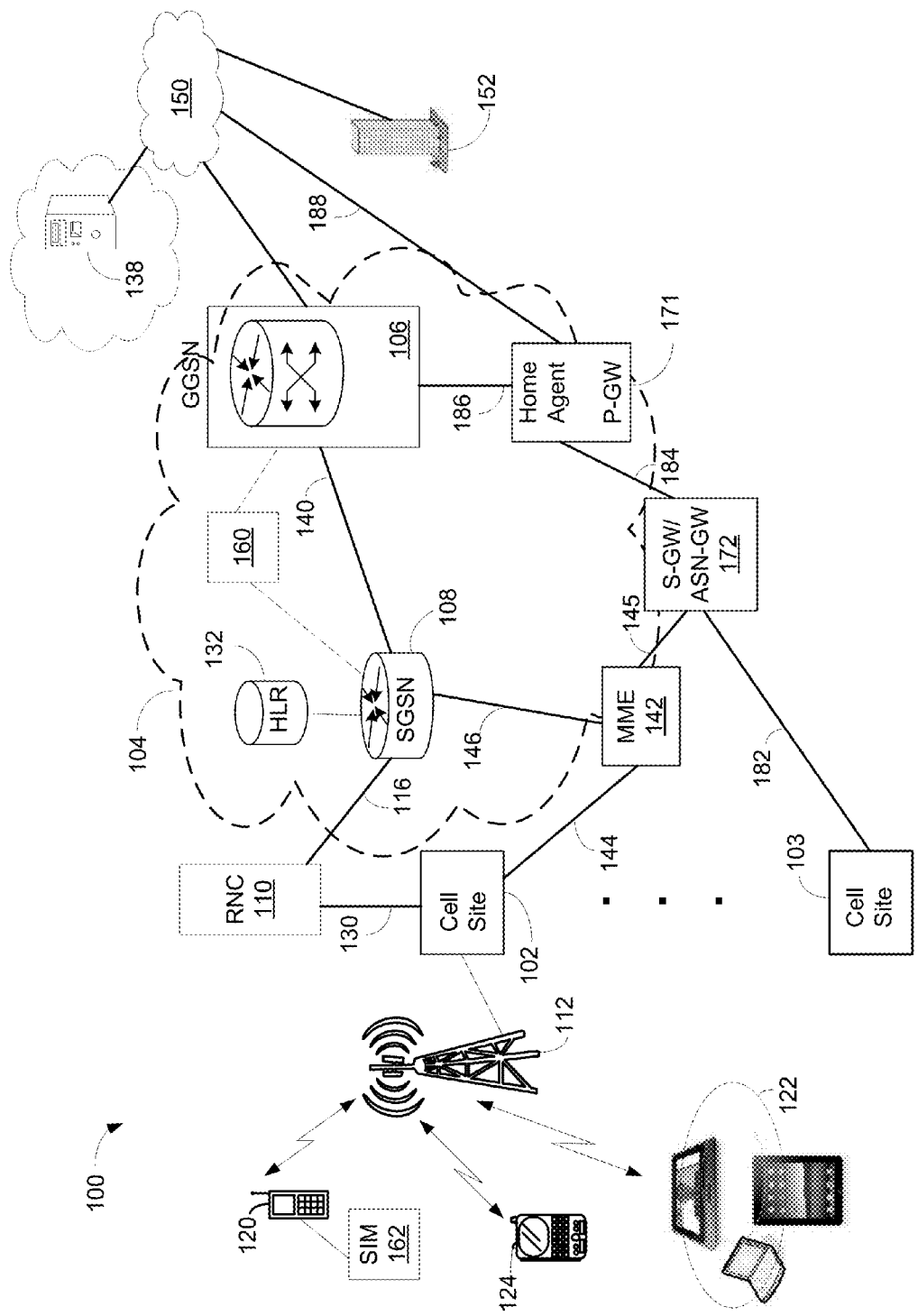
FIG. 1 is a block diagram illustrating a network configuration having one or more network entities configured to provide virtual redundancy in accordance with one embodiment of the present invention.

Exemplary embodiment(s) of the present invention is described herein in the context of a method, device, and apparatus of implementing geographic redundancy for network entities using virtual instances.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network able to transmit data in the form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

Information pertaining to the transfer of packet(s) through a network is embedded within the packet itself. Each packet traveling through one or more communications networks such as Internet and/or Ethernet can be handled independently from other packets in a packet stream or traffic. For example, each router, which may include routing, switching, and/or bridging engines, processes incoming packets and determines where the packet(s) should be forwarded.

To enhance network performance and reliability, a network is backed up by a virtual instance or virtual redundancy via routing cloud. The network for example, includes a primary packet core entity ("PCE"), routing cloud, and a secondary PCE. Both PCEs include virtual smart cores ("VSCs") for facilitating virtual backup over routing cloud. The primary PCE actively provides network services to subscribers. The routing cloud provides network communication between network entities or PCEs over long distances. The VSC of secondary PCE, in one example, facilitates a redundancy entity or backup entity for the primary PCE.

FIG. 1 is a block diagram 100 illustrating a network configuration having one or more network entities configured to provide virtual redundancy in accordance with one embodiment of the present invention. The network configuration may be considered as a third generation ("3G"), fourth generation ("4G"), LTE (long term evolution), or combination of 3G and 4G cellular network configuration. Diagram 100 illustrates cell sites 102-103, packet core entity ("PCE") 104, and Internet 150. Internet 150, which may also be replaced with or includes a wide area network ("WAN"), virtual private network ("VPN"), or routing cloud, provides communications between PCE 104 and network devices such as a network entity 138 and service provider(s) (or subscription partner 152). Subscription or service provider 152, in one aspect, can be a network and/or mobile carrier responsible for monitoring and managing user subscriptions. Network entity 138, for example, may be situated at a location geographically far away from the location hosting PCE 104. In one embodiment, network entity 138 is configured to backup PCE 104 using virtual network redundancy. It should be noted that the underlying concept of the exemplary embodiment(s) of the present invention would not change if one or more blocks (or devices) were added to or removed from diagram 100.

PCE 104 is also known as packet core, packet switching network, or evolved packet core ("EPC"). PCE 104 includes network nodes 106-108, mobility management entity ("MME") 142, radio network controller ("RNC") 110, serving gateway ("S-GW") 172, and packet data network gateway ("P-GW") or HomeAgent 171. Depending on the applications as well as network configurations, network elements such as SGSN and P-GW may be removed and/or added to PCE 104. For example, PCE 104 includes IP and/or Multi Protocol Label Switching ("MPLS") based network capable of operating at a layer of Open Systems Interconnection Basic Reference Model ("OSI model") for information transfer between clients and network servers.

PCE 104 alternatively is a network system, datacenter, network device, router, switch, line card, node, network entity, and/or a combination of one or more of network system, datacenter, network device, router, switch, line card, node, and network entity. PCE 104 includes nodes 106-108 and home location register ("HLR") 132 and is able to route packet traffic between cell sites 102-103 and Internet 150. For example, node 108 transmits information between cell site 102 and HLR 132 via connections 116 and 130. Node 106 transmits information to (and receives information from) cell site 102 via connections 140, 116, and 130. It should be noted that a different network architecture or configuration may have different layout of network elements to implement different cellular networks such as 3G, 4G, or 5G.

MME 142, in one aspect, is coupled to cell site 102 and S-GW 172 via connections 144-145. MME 142 facilitates data transfer between 3G and LTE or between 2G and LTE (or 4G). In LTE (or 4G) network environment, MME 142 performs various controlling/managing functions, such as UE (user equipment) idle mode for tracking, paging, and retransmitting activities. MME 142 also provides network security management as well as resource allocations. To access packet based and/or IP based networks, MME 142, in one aspect, is able to reach other networks such as Ethernet and/or Internet via S-GW 172 and P-GW 171.

S-GW 172, in one example, is coupled to MME 142 and cell site 103 via connections 145 and 182, and is capable of routing data packets from cell site 103 (eNodeB) or MME 142 or P-GW 171 via connections 145 and 184. Note that S-GW 172 can couple to additional network elements such as additional MMEs and/or base stations. In an EPC network environment, S-GW 172 can also be used to perform an anchoring function for mobility between 3G and 4G equipments. S-GW 172, in one aspect, performs various network management functions, such as authenticating device identity, terminating paths, paging idling UEs, storing data, routing information, generating replica, and the like.

P-GW 171, which is also known as Home Agent, is coupled to S-GW 172, GGSN 106, and Internet 150 via connections 184-188, wherein P-GW 171 is able to provide network communication between an UE and IP based networks such as Internet 150. P-GW 171 is used for connectivity, packet filtering, inspection, data usage, billing, PCRF (policy and charging rules function) enforcement, et cetera. P-GW 171 also provides an anchoring function for mobility between 3G and 4G (or LTE) packet core network(s). Note that P-GW 171 could be merged into GGSN 106 as a single NE or node. Alternatively, P-GW 171 is able to directly route data between UEs via Internet 150.

Node 106, in one example, is a gateway GPRS support node ("GGSN") wherein GPRS refers to general packet radio service. GGSN 106 may include one or more routers or switches capable of managing, monitoring, and routing network traffic or network flows between sources and destinations. Network flow or packet flow, in one example, is data traffic traveling through the network between source and destination. Network node or GGSN 106, hereinafter referred to both interchangeably, can also be a router, Access Service Network Gateway ("ASN-GW"), Packet Data Network Gateway ("PDN-GW"), serving gateway, switch, hub, or a combination of router, Access Service Network Gateway, P-GW, S-GW, switch, and/or line card.

Node 108 is a serving GPRS support node ("SGSN") configured to authenticate portable wireless UEs, registering mobile devices, collecting network usage information for billing, et cetera. A function of SGSN 108 is to adjust quality of service by activating or deactivating users' sessions. While SGSN 108 tracks and/or controls mobile communication, GGSN 106 inspects and routes information and/or packet traffic between mobile terminal(s) and intended destination (s). Alternatively, SGSN 108 is connected to MME 142 which is also able to route packet streams to/from LTE network. Note that SGSN 108 can include MME functions. It should be noted that node 108 can be SGSN, MME, and/or a combination of SGSN and MME.

RNC 110 may be coupled to other network elements such as a second RNC or PCU (packet control unit), not shown in FIG. 1, to enhance network management and communication. Connections 116 and 140 are used to facilitate communication between RNC 110 and nodes 106-108. RNC 110, in one example, provides network management for controlling NEs in UMTS (universal mobile telecommunications system) radio access network ("UTRAN") and base stations that are connected to it.

Cell site 102, also known as base station, node B, or eNodeB, includes a radio tower 112. Radio tower 112 is further coupled to various UEs, such as a cellular phone 120, a handheld device 124, tablets and/or iPad® 122 via wireless communications. Handheld device 124 can be a smart phone, such as iPhone®, BlackBerry®, Android®, and so on. In one aspect, handheld devices 120-124 store their IMSIs in their SIM cards such as SIM 162. Cell site 102 facilitates network communication between mobile devices such as handheld device 124 and iPad® 122 via radio tower 112. It should be noted that cell site 102 may include additional radio towers as well as other land switching circuitry.

PCE 104, in one embodiment, is configured to forward packets or data streams between cell sites 102-103 (base stations) and Internet 150. In order to efficiently route packets and data stream, PCE 104 aggregates and/or stores necessary forwarding data, such as subscriber context, subscriptions, connectivity states, QoS, and so on, in an accessible storage location or datacenter in or nearby PCE 104. To enhance reliability and prevent routing failures in the event of natural disaster(s), PCE 104, in one embodiment, is redundant or backed up by a virtual network redundancy ("VNR").

To implement a VNR, a virtual backup module 160 in PCE 104, in one aspect, is employed to provide virtual smart core ("VSC"). The VSC, in one example, is a virtual machine instantiated an independent hardware platform, operating system, storage device, and resource(s) in a physical hardware entity. In hardware virtualization, a host entity (a router or server) is an actual machine on which a virtualization operates, and a standby VSC is a virtual machine. The words host (or active) and standby are used to distinguish the software that runs on an actual machine from the software that runs on a virtual machine.

In operation, the active VSC in PCE 104, in one embodiment, communicates and backs up its redundancy data with a standby VSC which runs on an independent hardware machine that is physically situated a long distance away from PCE 104. For example, network entity 138, which is situated a long distance from PCE 104, may be configured to be a standby VSC through routing cloud such as Internet 150. The active VSC managed by virtual backup module 160, in one embodiment, synchronizes forwarding data between the active VSC in PCE 104 and standby VSC in network entity 138. A VNR for PCE 104 is instantiated when the standby VSC in network entity 138, for instance, contains mirror information between PCE 104 and network entity 138. When PCE 104 is down, the standby VSC in network entity 138, for example, takes over the network service by advertising reach ability to various cell cites 102-103 or base stations in accordance with stored forwarding and/or mirror information.

The VNR, in one embodiment, provides a method or technique for implementing geographic redundancy for routers or packet core boxes using virtual instances. The routers or packet core boxes host subscriber context and signal connectivity using routing protocols. Since the standby VSC uses the same IP address(es) as the active VSC, the VNR is able to provide a graceful way of moving back the context and connectivity to the active VSC once the previously failed packet core or router recovers. Note that the graceful way can be referred to as a seamless or smooth transition between an active and a standby entity and various connected devices (i.e., UEs) may not know such transition between the active and standby entities. The base station(s) may not notice the switching between the active and standby VSCs since the IP addresses are the same. It should be noted that a physical hardware machine or box implementing VNR are configured to support N-to-1 (N:1) or active-active scenarios for geographical redundancy, where N is an integer greater than one (1). Depending on the applications, an active-active virtual redundancy, in one aspect, is employed to enhance network performance.

Note that VNR can be used to backup any equipments doing routing and, subscriber management. Using virtual instances, various VNRs with layer 2 connections can be configured to provide geographical redundancy for any PCEs, such as routers, packet cores, subscriber management boxes, datacenters, switches, et cetera.

An advantage of using the VNR is to improve network reliability using one physical entity or machine to backup multiple entities using multiple virtual instances. VNR is especially effective in scenarios such as natural disasters. Depending on the applications, an N:1 virtual network redundancy configuration may be established. Another benefit of using VNR is to simplify network management since both active VSC and standby VSC use the same IP address(es).

Figure 2:
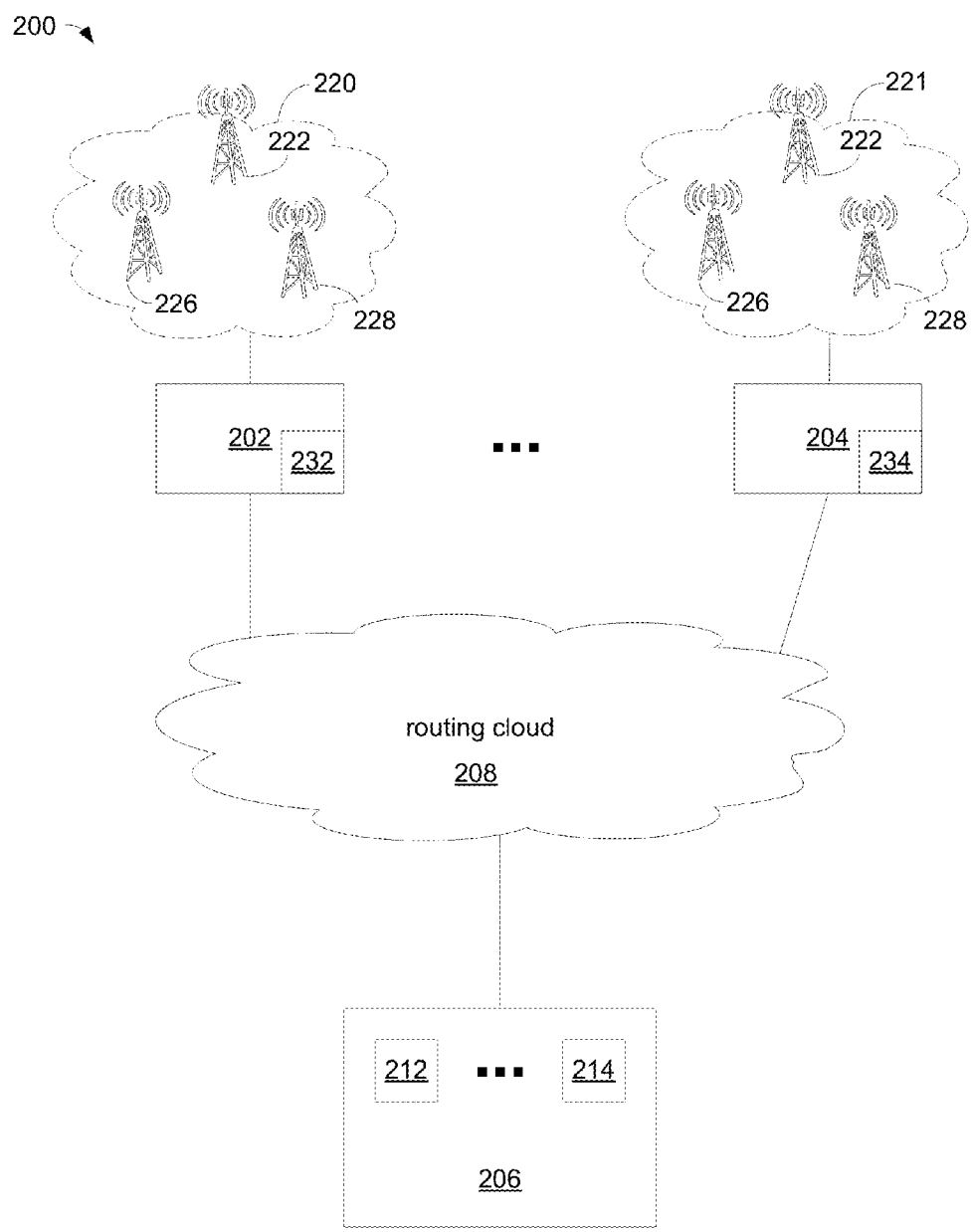
FIG. 2 is a block diagram illustrating an exemplary network configuration capable of providing N-to-1 (N:1) virtual network redundancy in accordance with one embodiment of the present invention.

FIG. 2 is a block diagram 200 illustrating an exemplary network configuration capable of providing N-to-1 (N:1) VNR in accordance with one embodiment of the present invention. Diagram 200 includes multiple PCEs 202-206 and routing cloud 208. In one embodiment, PCE 208 is configured to implement virtual redundant to backup PCEs 202-204 in the event any of PCEs is down. Routing cloud 208, in one aspect, includes Internet, local area network ("LAN"), cellular network, or a combination of Internet, LAN, and cellular network. It should be noted that the underlying concept of the exemplary embodiment(s) of the present invention would not change if one or more blocks (or devices) were added to or removed from diagram 200.

Routing cloud 208, in one example, is used to facilitate long distance communications between PCEs 202-206, wherein some PCEs such as PCEs 202-204 are further coupled to at least one mobile cell site or base station. For example, PCEs 202-206 are connected to cell sites 220-221, respectively. PCE 202 including an active VSC 232 is configured to provide network service such as packets routing to cell site 220. Similarly, PCE 204 including an active VSC 234 is configured to provide network service such as packets routing to cell site 221. It should be noted that the concept of present invention does not change if additional PCEs and cell sites are added or removed.

Cell site 220 uses multiple radio towers such as towers 222-228, also referred to as a paging group, to facilitate communication between mobile devices and gateways such as P-GW and S-GW. Similarly, cell site 221 employs radio towers 222-228 to provide communications network between mobile device and P-GW. It should be noted that the network layout shown in diagram 200 can be replaced by an alternative network such as 3GPP (3rd Generation Partnership Project) LTE based mobile broadband communications network with different network devices.

Active VSCs 232-234, in one embodiment, including virtual backup modules are virtually redundant (or backed up) by standby VSCs 212-214 in PCE 206 via routing cloud 208. PCE 206 is the backup system capable of instantiating multiple virtual instances to backup multiple active PCEs 202-204. PCE 206 establishes standby VSCs 212-214 as virtual redundancies to active VSCs 202-204. During a normal operation, mirror information (or data) such as forwarding data between active and standby VSCs is continuously synchronized. PCE 206, in one example, can be physically located long geographic distance(s) from PCE 202 or PCE 204. When a natural disaster strikes and PCE 202 for example is down, standby VSC 212 detects the failure and takes over the responsibility of network service from PCE 202 using its stored mirror information. After advertising reach ability using one or more network protocol, VSC 212 begins to provide network service to cell site 220 via routing cloud 208.

A PCE can be a packet core, a router, or a subscriber box that operates in a VSC which is a virtual instance created using any virtualization scheme. The standby instance of active VSC can be placed on any other hardware box via layer 3 connectivity. To implement virtualization, VSC uses routing protocols, such as OSPF, BGP, ISIS, et cetera, to advertise reach ability to subscribers and/or subnets. Under regular operation, the forwarding information between active VSC and standby VSC are constantly checked, updated, and synchronized. When the standby VSC detects a failure based on any of the configured triggers, the standby VSC starts up, which is similar to start a virtual machine or boot up a new box. On becoming active, VSC which changes its status from standby to active begins advertising the reach ability of the subnets and/or subscribers into the layer 3 routing cloud. When the routing converges, the traffic for the hosted subnets and subscribers will be attracted to the standby-VSC such as VSC 212.

In an alternative embodiment, PCEs 202-206 are routers or clusters of routers wherein standby router 206 provides virtual redundancy to multiple active routers 202-204 via routing cloud 208. It should be noted that it is possible to have one router to virtually backup multiple active routers since a standby router has a lot of unused capacity. Since a standby router does not provide routing activity until at least one active router is down, a standby router can be a virtual backup router to multiple active routers.

Figure 3:
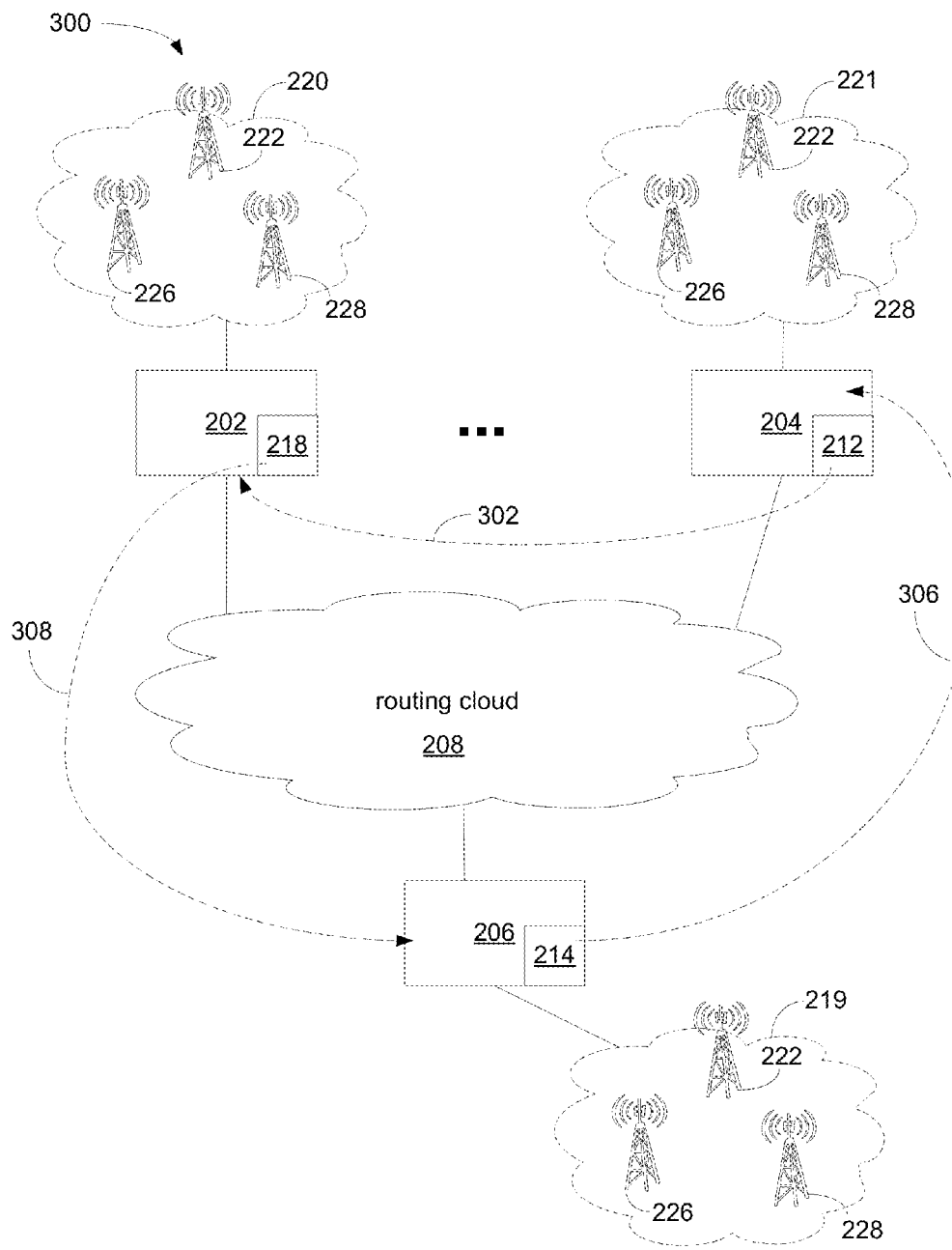
FIG. 3 is a block diagram illustrating an exemplary network configuration capable of providing active-to-active virtual network redundancy using virtual standby entities in accordance with one embodiment of the present invention.

FIG. 3 is a block diagram 300 illustrating an exemplary network configuration capable of providing active-to-active VNR using virtual standby entities in accordance with one embodiment of the present invention. Diagram 300 includes PCEs 202-206 and routing cloud 208 wherein PCEs 202-206 are further coupled to cell sites 219-221. Routing cloud 208, in one example, may be Internet, local area network ("LAN"), cellular network, or a combination of Internet, LAN, and cellular network. It should be noted that the underlying concept of the exemplary embodiment(s) of the present invention would not change if one or more blocks (or devices) were added to or removed from diagram 300.

Diagram 300 illustrates an active-to-active VNR configuration wherein each PCE includes an active VSC and a standby VSC. While the active VSC of the PCE is configured to provide network service to subscribers or user equipments ("UEs") via connected cell site, the standby VSC of the PCE is used to virtually backup another PCE located long or short distance away. For example, the active VSC of PCE 202 provides network service including packets routing to UEs connected to cell site 220, standby VSC 218 is used to virtually backup PCE 206 via routing cloud 208. For example, PCE 202 may be located in San Jose, Calif. while PCE 206 may be located at New York City coupled via routing cloud. Similarly, the active VSC of PCE 204 provides network service to UEs coupled to cell site 221, standby VSC 212 of PCE 204 is used to backup PCE 202 virtually. Also, the active VSC of PCE 206 provides network service to UEs coupled to cell site 219, standby VSC 214 of PCE 204 is used to backup PCE 204 virtually via routing cloud.

In a network layout illustrated in FIG. 3, a VNR configuration includes PCEs 202-204 and routing cloud 208. PCE 202 actively provides network services to a group of subscribers through base station 220. PCE 202 includes a standby VSC 218 able to remotely backup a PCE 206 via virtual instances as indicated by numeral 308. Routing cloud 208 is operable to provide network communication between two or more network entities separated by geographic distances.

PCE 204 provides network services to a second group of subscribers via base station 221. PCE 204 includes a standby VSC 212 used to facilitate a standby entity for PCE 202 as indicated by numeral 302. PCE 206 includes a standby VSC 214 used to facilitate a standby entity for PCE 204 as indicated by numeral 306.

The PCE can be an EPC that includes an MME, SGW, and PGW configured to maintain a database containing subscriber context. The EPC may further include a GGSN, SGSN, and policy and charging rules function ("PCRF") operable to maintain and manage information and status relating to the subscriptions. For example, VSC 212 and PCE 202 should contain similar subscriber context and connectivity information. Routing cloud 208 is a virtual switching network able to facilitate information transfer between PCEs through substantial geographic distances. Each PCE may be a router or a cluster of routers. Since the virtual instance picks up the original IP addresses, devices connected or served by the down PCE are generally not affected. In one aspect, the base stations are not necessarily aware of the down PCE if the standby VSC takes over the routing tasks seamlessly. An advantage of using VNR is to simplify management to virtually redundant nodes and/or PCEs since the IP addresses remain the same.

Figure 4:
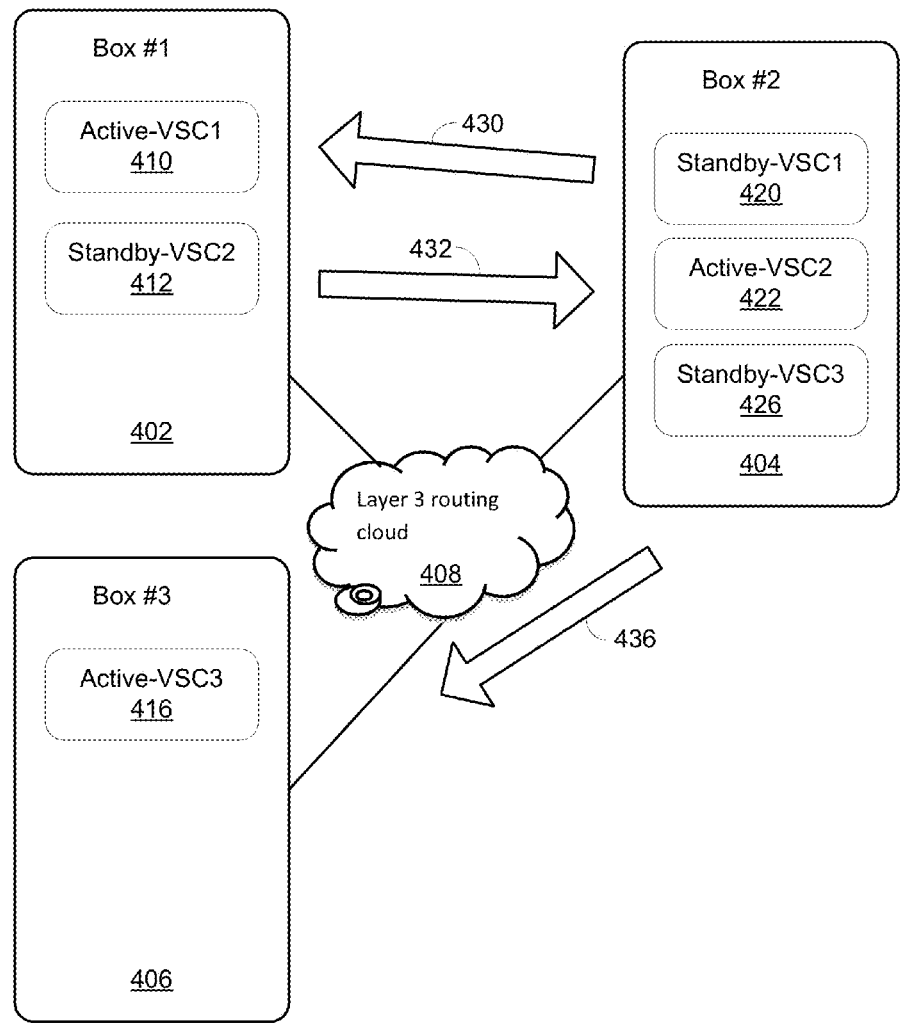
FIG. 4 is a block logic diagram illustrating an exemplary network configuration capable of providing redundancy using a combination of active-to-active and active-to-standby configurations in accordance with one embodiment of the present invention.

FIG. 4 is a block logic diagram 400 illustrating an exemplary network capable of providing VNR using a combination of active-to-active and active-to-standby configurations in accordance with one embodiment of the present invention. Diagram 400 includes PCE 402-406 and routing cloud 408 wherein the PCE can be a box, cluster of boxes, router, EPC, line card, node, network entity, and the like. To simplify forgoing discussion, the term "box" is used to indicate a network element which can be a datacenter, network switch, router, hub, et cetera. It should be noted that the underlying concept of the exemplary embodiment(s) of the present invention would not change if one or more blocks (or devices) were added to or removed from diagram 400.

Box1, which is PCE 402, includes an active VSC1 410 and standby VSC2 412 wherein active VSC1 handles network service or traffic for UEs that are directly or indirectly connected to Box1. Box2, which is PCE 404, includes an active VSC2 422, standby VSC1 420, and standby VSC3 426, wherein active VSC2 provides network service to UEs that are directly or indirectly coupled to box2. Box3, which is PCE 406, includes an active VSC3 which provides network service to UEs that are directly or indirectly coupled to box3. Boxes are logically connected by routing cloud 408. In one embodiment, routing cloud 408 is a layer 3 routing cloud.

The standby VSC2 in box1, in one embodiment, is configured to be a standby virtual entity for backing up active VSC2 422 in box2 as indicated by numeral 432. In the event that box2 is down, standby VSC2 is configured to take over the routing (or network service) responsibility from the active VSC2. As such, the overall impact of network performance due to the box2 failure is significantly reduced. Providing VNR can enhance overall network performance.

The standby VSC1 420 in box2, in one embodiment, is configured to be a standby virtual entity for backing up active VSC1 410 in box1 as indicated by numeral 430. In the event that box1 is down, standby VSC1 is capable of taking over the routing (or network service) responsibility from the active VSC1. In addition, standby VSC3 426 is a standby virtual instances or entity for backing up active VSC3 416 in box3 as indicated by numeral 436. In the event that box3 is down, standby VSC3 takes over the routing (or network service) responsibility from the active VSC3.

The VSC, in one embodiment, employs interior gateway protocol ("IGP") and/or exterior gateway protocol, such as border gateway protocol ("BGP") to advertise reach ability for subscribers and/or UEs on subnets. Note that IGP includes open shortest path first ("OSPF"), intermediate system to intermediate system ("ISIS"), et cetera for advertising to reach subscribers and/or subnets. In operation, the active VSC continuously checks status, state, and configuration, and makes necessary updates and changes to the standby VSC.

During operation, when standby VSC1 420 detects a failure of active VSC1 410 in box1 based on one of predefined triggers, it starts up based on its internally stored backup data. Note that starting a standby VSC is similar to begin a virtual machine or booting up a new box on the box2. Once standby VSC1 420 becomes active, it starts advertising the reach ability to subnets and subscribers via layer 3 routing cloud 408. When routing converges, traffic for the hosted subnets and subscribers will be attracted to standby VSC1 520 on box2. Note that seamless switching between the active and the standby VSCs can preserve and protects network switching activities thereby it enhances overall network performance. It should be noted that box2 is also hosting active subscribers and subnets in its own active VSC2 422. In addition, box2 is also configured to be acting as a standby for Box3 which has an active VSC3 416. When box1 recovers and/or comes back into service, switchover from standby VSC1 420 to active VSC1 410 can be performed in a graceful manner wherein subscribers and subnets on VSC2 and VSC3 on box2 are not affected.

Figure 5:
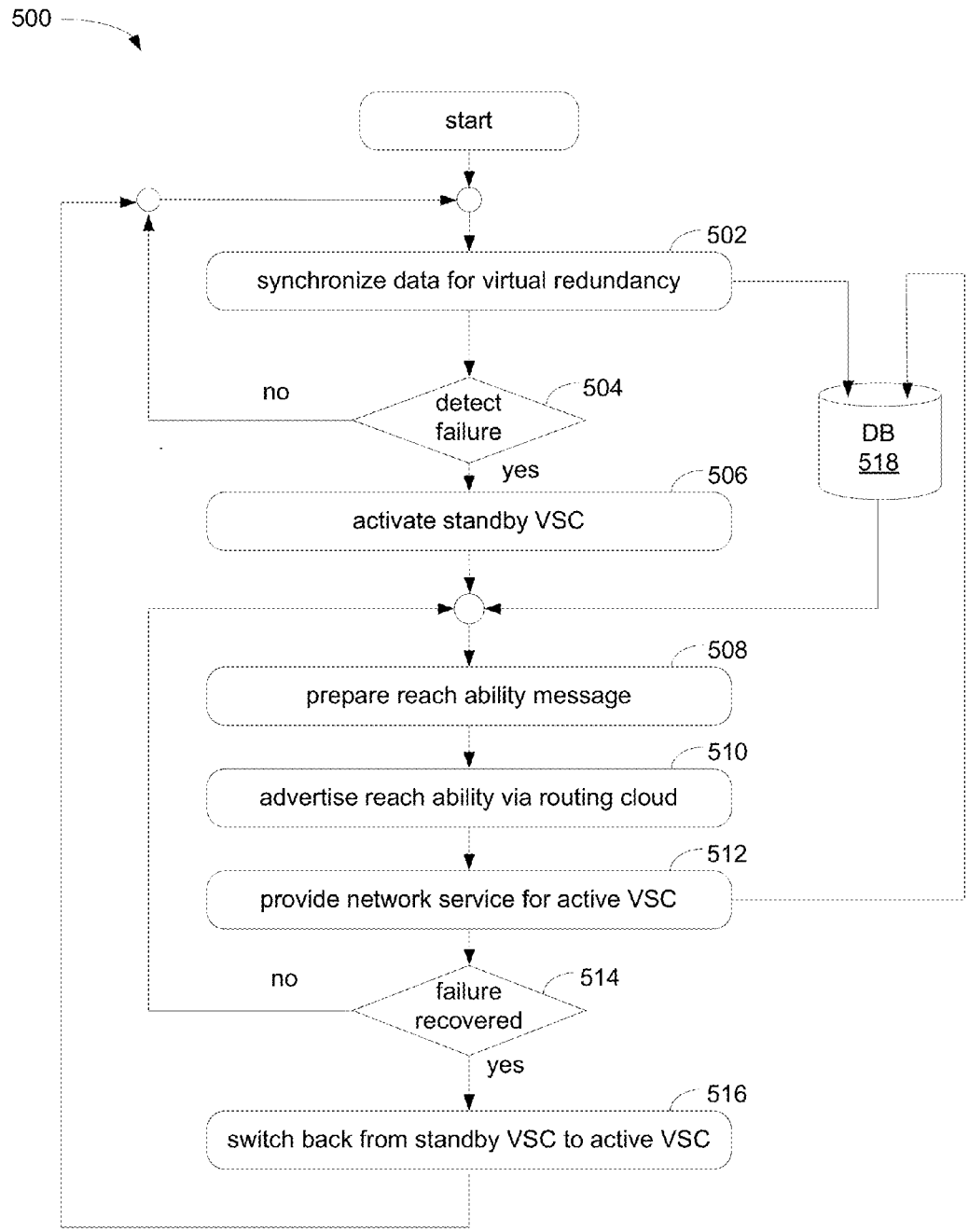
FIG. 5 is a logic flow diagram illustrating an exemplary process of virtual network redundancy between active network entity and standby network entity in accordance with one embodiment of the present invention.

FIG. 5 is a logic flow diagram 500 illustrating an exemplary process of VNR between active network entity and standby entity in accordance with one embodiment of the present invention. At block 502, the process of VNR synchronizes necessary backup data or mirror information such as forwarding information between active VSC and standby VSC. The backup data is stored in a database 518. At block 504, the process examines whether a trigger of predefined failure(s) is detected. If no failure is detected, the process goes back to block 502, otherwise the process proceeds to block 506.

After activating the standby VSC at block 506, the process, at block 508, prepares reach ability messages or notification based on the backup data stored in database 518. Once the messages of reach ability are advertised via routing cloud at block 510, the standby VSC at block 512 begins to provide network services such as traffic routing in place of active VSC while it is down. It should be noted that the backup data is continuously maintained and the backup data which will be transferred back to the active VSC as soon as the active VSC recovers from the failure.

At block 514, the process checks to determine whether the failure has been recovered. If the active VSC is still in a failure state, the process proceeds to block 508 and continues to provide network services for the active VSC. If the active VSC is recovered, the process, at block 516, begins a switchover from the standby VSC to the active VSC including transporting the updated backup data which will assist the active VSC to take over the network service from where the standby VSC left off. After the active VSC takes over the network service gracefully, the process loops back to block 502.

The exemplary aspect of the present invention includes various processing steps, which will be described below. The steps of the aspect may be embodied in machine, router, or computer executable instructions. The instructions can be used to create a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
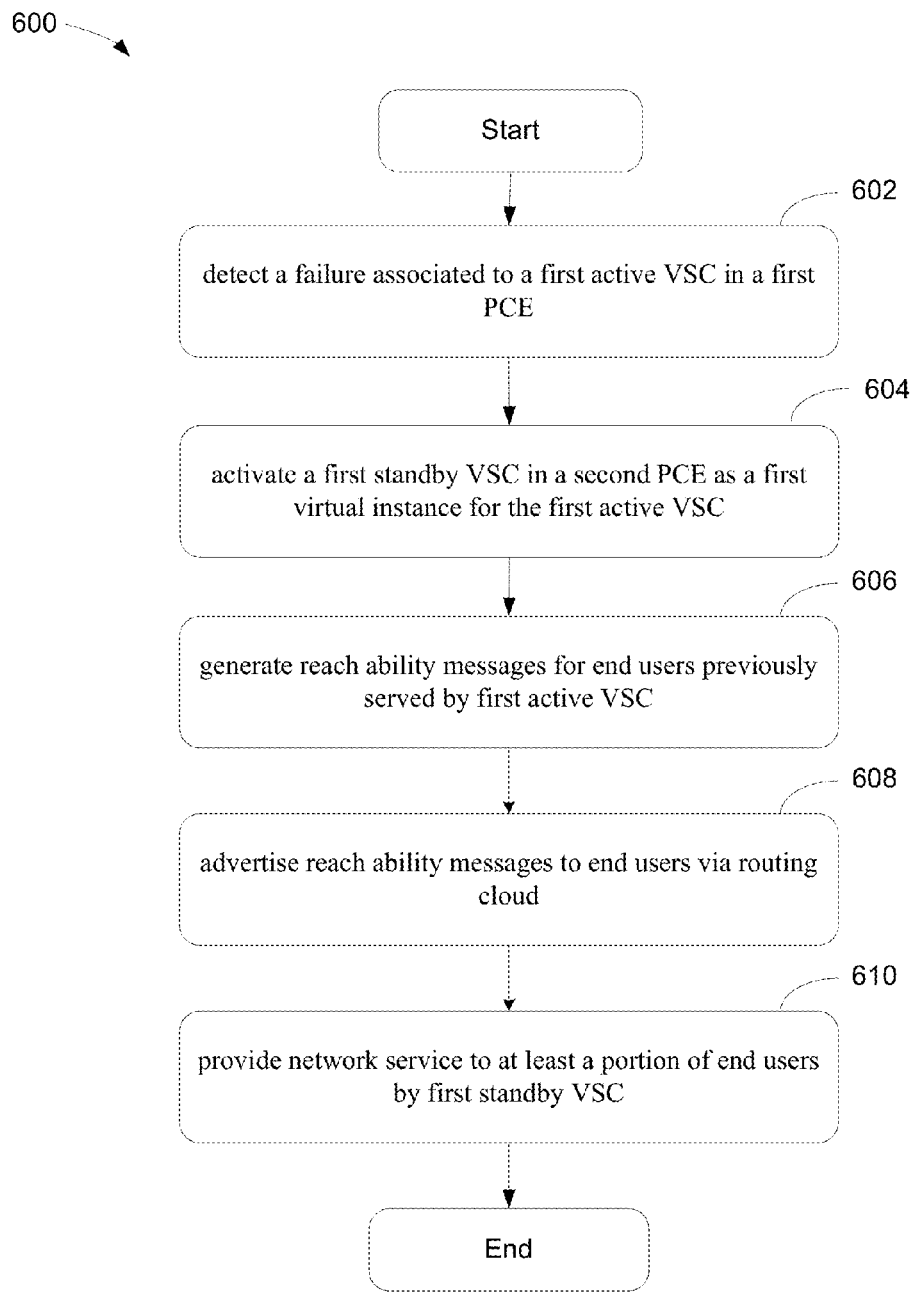
FIG. 6 is a flowchart illustrating an exemplary process of virtual network redundancy using virtual instance(s) to take over service responsibility upon detecting a failure of the active entity in accordance with one embodiment of the present invention.

FIG. 6 is a flowchart 600 illustrating an exemplary process of VNR using virtual instance(s) to take over service responsibility upon detecting a failure of active entity in accordance with one embodiment of the present invention. At block 602, a process of network redundancy detects a failure associated to a first active VSC in a first PCE based on a predefined trigger. Note that the forwarding information such as subscriber context and signal connectivity is synchronized between the first active VSC in the first PCE and the first standby VSC in the second PCE.

At block 604, a first standby VSC in a second PCE is activated as a first virtual instance for the first active VSC. At block 606, the reach ability messages for end users who are previously served by the first active VSC is generated based on information stored in a redundant storage or database. The process, at block 608, advertises the reach ability messages to end users via routing cloud.

At block 610, the process is capable of providing network service to at least a portion of end users by the first standby VSC through VNR. When the first active VSC recovers from the failure, network service seamlessly switches back from the first standby VSC to the first active VSC. In one embodiment, the process is able to continue hosting active subscribers and subnets by a second active VSC in the second PCE. Alternatively, the process is capable of providing a second standby VSC in the first PCE as a virtual redundancy to a second active VSC in the second PCE.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A communications network, comprising:
   a first packet core entity ("PCE") having a first active virtual machine ("VM") and a first standby VM, the first active VM configured to actively provide network services to a first plurality of subscribers;
   a routing cloud coupled to the first PCE and operable to provide network communication across geographically separated distances between two or more network entities; and
   a second PCE coupled to the first PCE via the routing cloud and having a second active VM and a second standby VM, wherein the second standby VM is configured to facilitate a redundancy entity for the first PCE.

2. The network of claim 1, further comprising a third PCE coupled to the second PCE via the routing cloud and having a third active VM and a third standby VM, wherein the third standby VM is configured to facilitate a virtual redundancy entity for the second PCE, wherein a VM is a virtual smart core ("VSC").

3. The network of claim 2, further comprising a fourth PCE coupled to the second PCE via the routing cloud and configured to actively provide network services to a second plurality of UEs, wherein the fourth PCE is backed up by a fourth VSC virtualized by the second PCE.

4. The network of claim 1, wherein the first PCE is an evolved packet core ("EPC") including a mobility management entity ("MME"), serving gateway ("SGW"), and packet data network gateway ("PGW") configured to maintain a database containing subscribers context.

5. The network of claim 4, wherein the EPC further includes a gateway general packet radio service ("GPRS") support node ("GGSN"), serving GPRS support node ("SGSN"), and policy and charging rules function ("PCRF") operable to maintain and manage information and status relating to a plurality of subscriptions.

6. The network of claim 1, wherein the first active VM including a virtual backup module of the first PCE is configured to communicate with the second standby VM of the second PCE to facilitate virtual redundancy for the first PCE.

7. The network of claim 1, wherein the routing cloud is a virtual switching network able to facilitate information transfer between PCEs through substantial geographic distances.

8. The network of claim 1, wherein the second active VM of the second PCE maintains an active virtual smart core ("VSC") able to advertise reach ability to the plurality of subscribers while maintaining the second standby VSC.

9. The network of claim 8, wherein the second PCE maintains a standby VSC for a third PCE via the routing cloud.

10. A virtual backup network configuration, comprising:
    a first packet core entity ("PCE") having a first active virtual smart core ("VSC") and a first standby VSC, the first active VSC actively providing network services to a first plurality of subscribers, the first standby VSC of the first PCE able to remotely backup a network entity via virtual instances;
    a routing cloud coupled to the first PCE and operable to provide network communication between two or more network entities separated by geographic distances; and
    a second PCE coupled to the first PCE via the routing cloud and having a second active VSC and a second standby VSC, the second active VSC providing network services to a second plurality of subscribers, wherein the second standby VSC facilitates a standby entity for the first PCE, wherein a VSC is a virtual machine ("VM").

11. The configuration of claim 10, wherein the first PCE is an evolved packet core ("EPC") including a mobility management entity ("MME"), serving gateway ("SGW"), and packet data network gateway ("PGW") configured to maintain a database containing subscriber context.

12. The configuration of claim 11, wherein the EPC further includes a gateway general packet radio service ("GPRS") support node ("GGSN"), serving GPRS support node ("SGSN"), and policy and charging rules function ("PCRF") operable to maintain and manage information and status relating to a plurality of subscriptions.

13. The configuration of claim 10, wherein the second standby VSC and the first PCE contain similar subscriber context and connectivity information.

14. The configuration of claim 10, wherein the routing cloud is a virtual switching network able to facilitate information transfer between PCEs through substantial geographic distances.

15. The configuration of claim 10, wherein the first PCE is a router.

16. A method of network redundancy, comprising:
    detecting a failure associated to a first active virtual smart core ("VSC") in a first packet core entity ("PCE") based on a predefined trigger;
    identifying a first standby VSC generated in accordance with a virtual redundancy for the first PCE containing virtual instances that are similar to subscriber context and signal connectivity utilized by the first PCE;

activating the first standby VSC in a second PCE as a first virtual instance for the first active VSC;

generating reach ability messages for a plurality of end users previously served by the first active VSC based on information stored in a redundancy storage;

advertising the reach ability messages to the plurality of end users via routing cloud; and providing network service to at least a portion of the plurality of end users by the first standby VSC through virtual network service.

17. The method of claim 16, further comprising switching back network service from the first standby VSC to the first active VSC when the first active VSC recovers from the failure.

18. The method of claim 17, further comprising continuing to host active subscribers and subnets by a second active VSC in the second PCE.

19. The method of claim 16, further comprising synchronizing subscriber context and signal connectivity between the first active VSC in the first PCE and the first standby VSC in the second PCE.

20. The method of claim 16, further comprising providing a second standby VSC in the first PCE as a virtual redundancy entity to a second active VSC in the second PCE.

* * * * *